US008283393B2

(12) United States Patent
Skaggs et al.

(10) Patent No.: US 8,283,393 B2

(45) Date of Patent: Oct. 9, 2012

(54) DEVICE FOR PRODUCING DISPERSIONS AND METHOD OF PRODUCING DISPERSIONS

(75) Inventors: Ken W. Skaggs, Lake Jackson, TX (US); Bedri Erdem, Midland, MI (US); Paul A. Gillis, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 602 days.

(21) Appl. No.: 12/519,829

(22) PCT Filed: Dec. 19, 2007

(86) PCT No.: PCT/US2007/088189

§ 371 (c)(1),
(2), (4) Date: Jun. 18, 2009

(87) PCT Pub. No.: WO2008/077116

PCT Pub. Date: Jun. 26, 2008

(65) Prior Publication Data

US 2009/0312489 A1 Dec. 17, 2009

Related U.S. Application Data

(60) Provisional application No. 60/875,657, filed on Dec. 19, 2006.

(51) Int. Cl.
*B29C 47/10* (2006.01)

(52) U.S. Cl. ........ 523/348; 366/304; 422/130; 422/600; 422/630

(58) Field of Classification Search .................. 366/304; 422/134, 600, 630; 523/348
See application file for complete search history.

(56) References Cited

U.S. PATENT DOCUMENTS

| | | | |
|---|---|---|---|
| 2,904,407 | A | 9/1959 | Rosenthal et al. |
| 4,742,095 | A | 5/1988 | Markusch et al. |
| 5,539,021 | A | 7/1996 | Pate et al. |
| 5,688,842 | A | 11/1997 | Pate, III et al. |
| 5,959,027 | A | 9/1999 | Jakubowski et al. |
| 6,087,440 | A | 7/2000 | Skaggs et al. |
| 6,720,385 | B2 | 4/2004 | Tabor et al. |
| 2001/0021372 | A1 | 9/2001 | Omtveit et al. |
| 2004/0242764 | A1 | 12/2004 | Yamada et al. |

FOREIGN PATENT DOCUMENTS

| | | |
|---|---|---|
| DE | 7242670 | 1/1976 |
| EP | 0291819 | 11/1988 |
| EP | 0786286 | 7/1997 |
| GB | 2169814 | 7/1986 |

OTHER PUBLICATIONS

International Search Report (PCT/US2007/088189).

*Primary Examiner* — Edward Cain

(57) ABSTRACT

The instant invention is a device for producing dispersions and method of producing dispersions. The device for producing dispersions includes a first stator, a second stator, a shell encasing the first stator and the second stator, a rotor being disposed therebetween the first stator and the second stator thereby forming a first chamber and a second chamber, at least one first inlet port into the first chamber, and at least one outlet port out of the second chamber. The device may optionally include at least one additional second inlet port into the second chamber. The method of producing a polyurethane dispersion includes the following steps: (1) providing a device for producing a dispersion including a first stator, a second stator, a shell encasing the first stator and the second stator, a rotor being disposed therebetween the first stator and the second stator thereby forming a first chamber and a second chamber, at least one first inlet port into the first chamber, at least one outlet port out of the second chamber; and optionally one or more additional second inlet ports into the second chamber; (2) introducing a prepolymer phase and an aqueous phase into the first chamber via the first inlet ports; (3) emulsifying the prepolymer phase in the aqueous phase; (4) thereby producing a prepolymer emulsion; (5) introducing a chain extender agent into the emulsion in the second chamber via the second inlet port; (6) chain extending the prepolymer; and (7) thereby producing a polyurethane dispersion.

6 Claims, 6 Drawing Sheets

DEVICE FOR PRODUCING DISPERSIONS AND METHOD OF PRODUCING DISPERSIONS

CROSS-REFERENCE TO RELATED APPLICATIONS

This application is a non-provisional application claiming priority from the U.S. Provisional Patent Application Ser. No. 60/875,657, filed on Dec. 19, 2006 entitled "A device for producing dispersions and method of producing dispersions," the teachings of which are incorporated herein as if reproduced in full hereinbelow.

FIELD OF INVENTION

The instant invention relates to a device for producing dispersions and method of producing dispersions. The instant invention further relates to a device for producing emulsions, suspensions, and latexes, and methods of making the same.

BACKGROUND OF THE INVENTION

The use of polyurethane dispersions in different fields is generally known. Different methods such as batch process or continuous process using a variety of equipments may be employed to produce such dispersions.

U.S. Pat. No. 6,720,385 discloses aqueous polyurethane latexes prepared from prepolymer formulations including a polyisocyanate component and polyol component, wherein from 5 to 40 percent of the weight of the polyol component is ethylene oxide in the form of ethylene oxide applied as an end cap onto a propylene oxide or higher oxyalkylene polyoxyalkylene polyol, and no more than 45 percent of the weight of polyol component is ethylene oxide.

U.S. Pat. No. 5,959,027 discloses a polyurethane/urea/thiourea latex having a narrow molecular weight polydispersity and sub-micron particle size, which is prepared by first preparing a high internal phase ratio (HIPR) emulsion of a polyurethane/urea/thiourea prepolymer, then contacting the emulsion with a chain-extending reagent under such conditions to form the polymer latex.

U.S. Pat. No. 5,688,842 discloses a method of preparing a high internal phase ratio emulsion without phase inversion comprising the steps of: a) continuously merging into a disperser and in the presence of an emulsifying and a stabilizing amount of a surfactant, a continuous phase liquid stream having a flow rate $R_1$, and a disperse phase liquid stream having a flow rate $R_2$; and b) mixing the merged streams with a sufficient amount of shear, and with $R_2$: $R_1$ sufficiently constant, to form the high internal phase ratio emulsion without phase inversion or stepwise distribution of an internal phase into an external phase; wherein $R_2$: $R_1$ encompasses a range, the lower limit of which range being defined by a point where the volume average particle size of the high internal phase ratio emulsion begins to show an inverse dependence on $R_2$: $R_1$, and wherein the upper limit of which range is just less than an $R_2$: $R_1$ where a phase inversion of the high internal phase ratio emulsion takes place.

U.S. Pat. No. 5,539,021 discloses a method of preparing a high internal phase ratio emulsion without phase inversion comprising the steps of: a) continuously merging into a disperser and in the presence of an emulsifying and a stabilizing amount of a surfactant, a continuous phase liquid stream having a flow rate $R_1$, and a disperse phase liquid stream having a flow rate $R_2$; and b) mixing the merged streams with a sufficient amount of shear, and with $R_2$: $R_1$ sufficiently constant, to form the high internal phase ratio emulsion without phase inversion or stepwise distribution of an internal phase into an external phase; wherein $R_2$: $R_1$ encompasses a range, the lower limit of which range being defined by a point where the volume average particle size of the high internal phase ratio emulsion begins to show an inverse dependence on $R_2$: $R_1$, and wherein the upper limit of which range is just less than an $R_2$: $R_1$ where a phase inversion of the high internal phase ratio emulsion takes place.

U.S. Pat. No. 4,742,095 discloses a continuous process for the production of aqueous polyurethane-urea dispersions by (a) mixing an emulsifiable isocyanate-terminated prepolymer with an aqueous medium in a low shear, stator-rotor dynamic mixer operating at a speed of about 500 to 8000 rpm utilizing a mixing wattage of about 0.3 to 10.0 watts/cubic centimeter and a mixing volume of at least about 0.1 liters, the average residence time of the aqueous medium and the prepolymer being about 1 to 30 seconds and the overall flow rate through the dynamic mixer being at least about 50 kg/h and (b) reacting the dispersed isocyanate-terminated prepolymer prepared in (a) with a polyamine chain extender to form an aqueous polyurethane-urea dispersion.

U.S. Patent Application Publication No. 2004/0242764 discloses a process for producing a polyurethane emulsion by emulsifying a urethane prepolymer, which contains substantially no organic solvent and also has at least two isocyanate groups per one molecule, with water and completing chain extension.

Despite the research efforts in developing more stable dispersions, there is still a need for an improved device to produce dispersions with optimum particle sizes, solid level contents, and reduced fouling; furthermore, there is still a need for an improved method of producing such dispersions.

SUMMARY OF THE INVENTION

The instant invention is a device for producing dispersions and method of producing dispersions. The device for producing dispersions includes a first stator, a second stator, a shell encasing the first stator and the second stator, a rotor being disposed therebetween the first stator and the second stator thereby forming a first chamber and a second chamber, at least one first inlet port into the first chamber, and at least one outlet port out of the second chamber. The device may optionally include at least one additional second inlet port into the second chamber. The method of producing a polyurethane dispersion includes the following steps: (1) providing a device for producing a dispersion including a first stator, a second stator, a shell encasing the first stator and the second stator, a rotor being disposed therebetween the first stator and the second stator thereby forming a first chamber and a second chamber, at least one first inlet port into the first chamber, at least one outlet port out of the second chamber; and optionally one or more additional second inlet ports into the second chamber; (2) introducing a prepolymer phase and an aqueous phase into the first chamber via the first inlet ports; (3) emulsifying the prepolymer phase in the aqueous phase; (4) thereby producing a prepolymer emulsion; (5) introducing a chain extender agent into the emulsion in the second chamber via the second inlet port; (6) chain extending the prepolymer; and (7) thereby producing a polyurethane dispersion.

BRIEF DESCRIPTION OF THE DRAWINGS

For the purpose of illustrating the invention, there is shown in the drawings an exemplary form; it being understood, however, that this invention is not limited to the precise arrangements and instrumentalities shown.

DETAILED DESCRIPTION OF THE INVENTION

Figure 1:
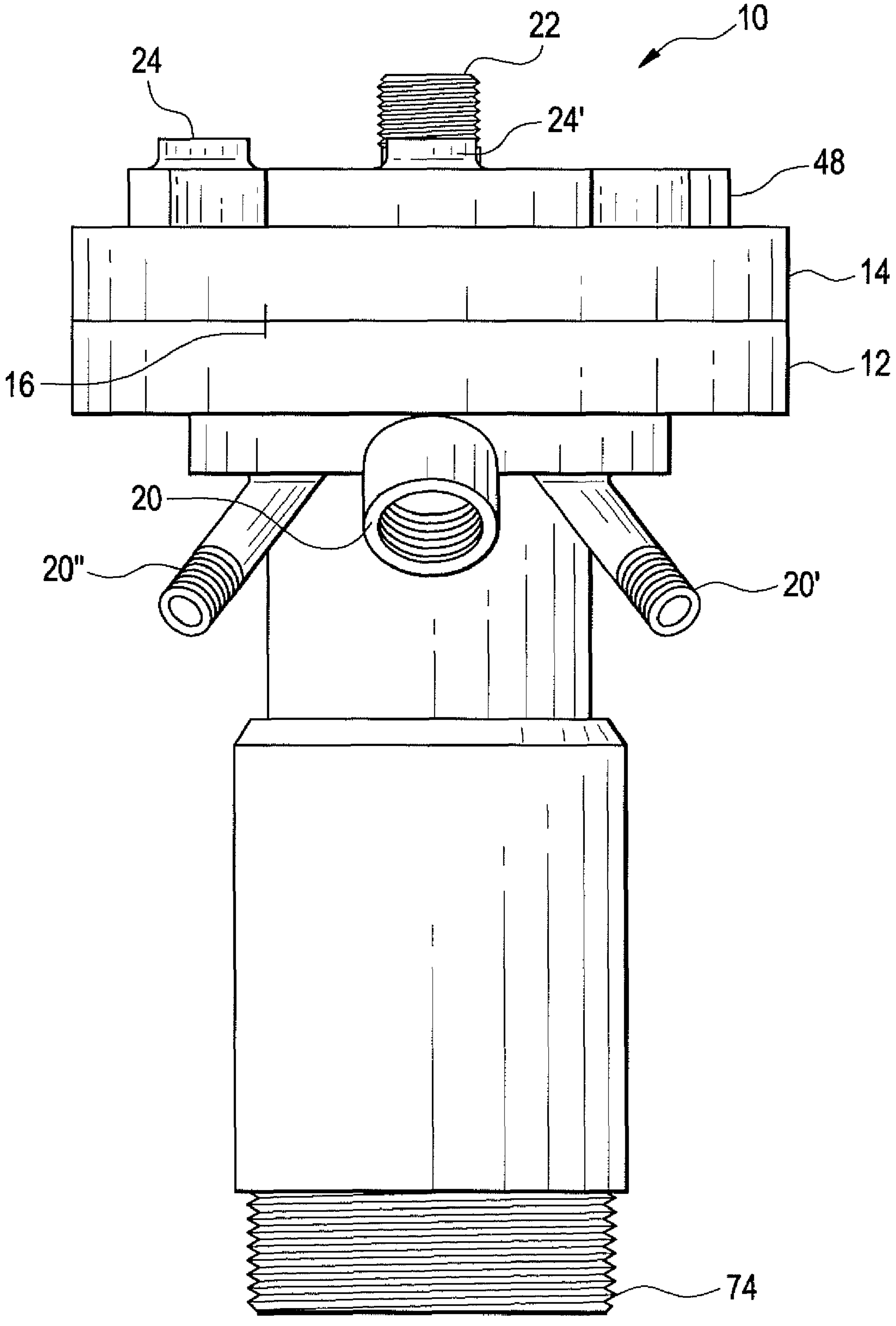
FIG. 1 is a first embodiment of a device for producing dispersions according to instant invention.
Figure 2:
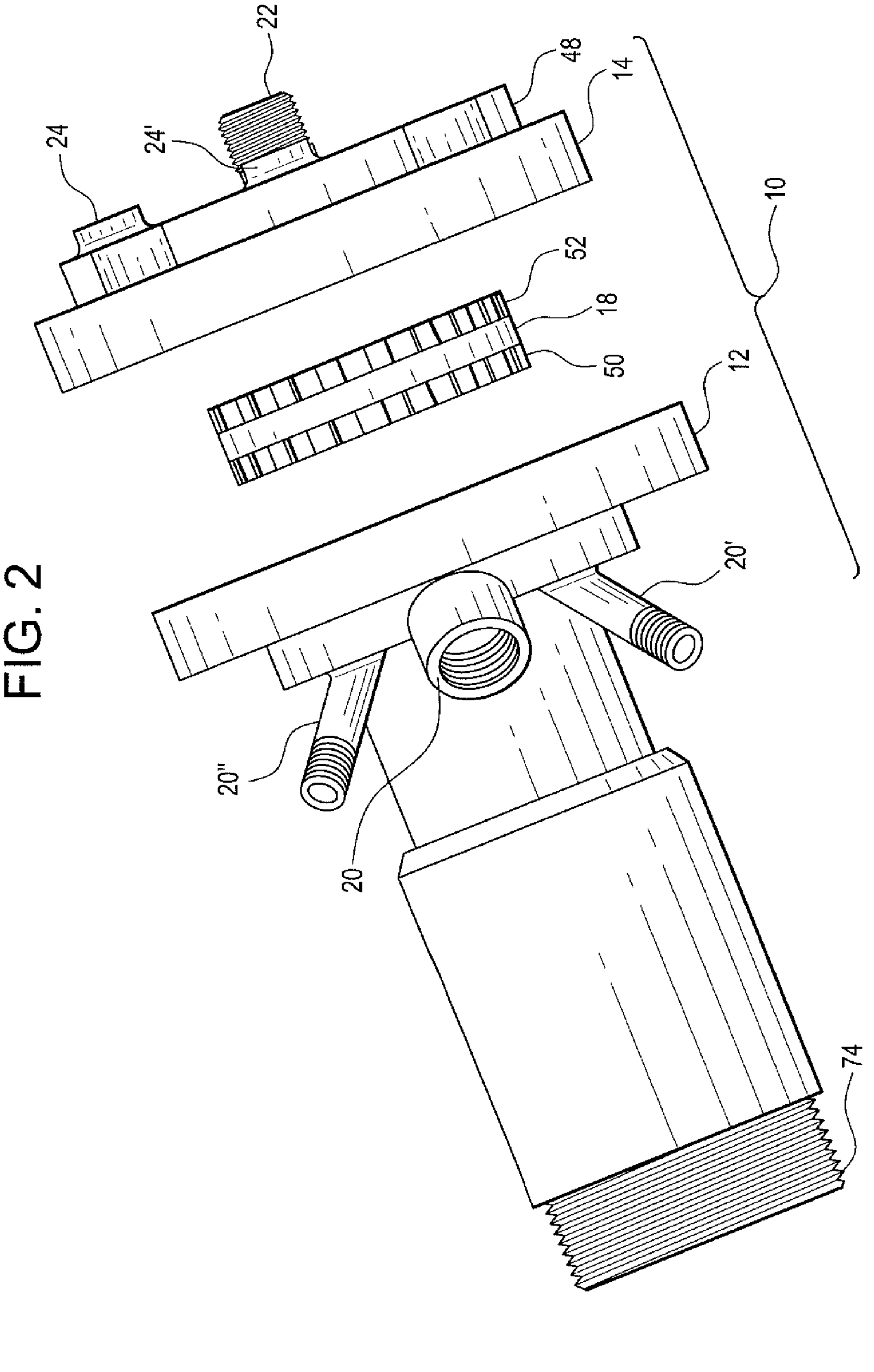
FIG. 2 is an exploded view of the device for producing dispersions of FIG. 1.

Referring to the drawings wherein like numerals indicate like elements, there is shown, in FIGS. 1 and 2, a first embodiment of a device 10 for producing dispersions according to instant invention. Referring to FIGS. 1-5, device 10 for producing dispersions includes a first stator 12, a second stator 14, a shell 16 encasing first stator 12 and second stator 14, a rotor 18 disposed therebetween the first stator 12 and second stator 14 thereby forming a first chamber (not shown) and second chamber (not shown), at least one first inlet port 20 into the first chamber (not shown), and at least one outlet port 22 out of the second chamber (not shown). The device 10 for producing dispersions may optionally include at least one additional second inlet port 24 into the second chamber (not shown).

Referring to FIGS. 1-2, shell 16 may have any shape; for example, shell 16 may have a cylindrical shape. Shell 16 encases first stator 12 and second stator 14.

Figure 3:
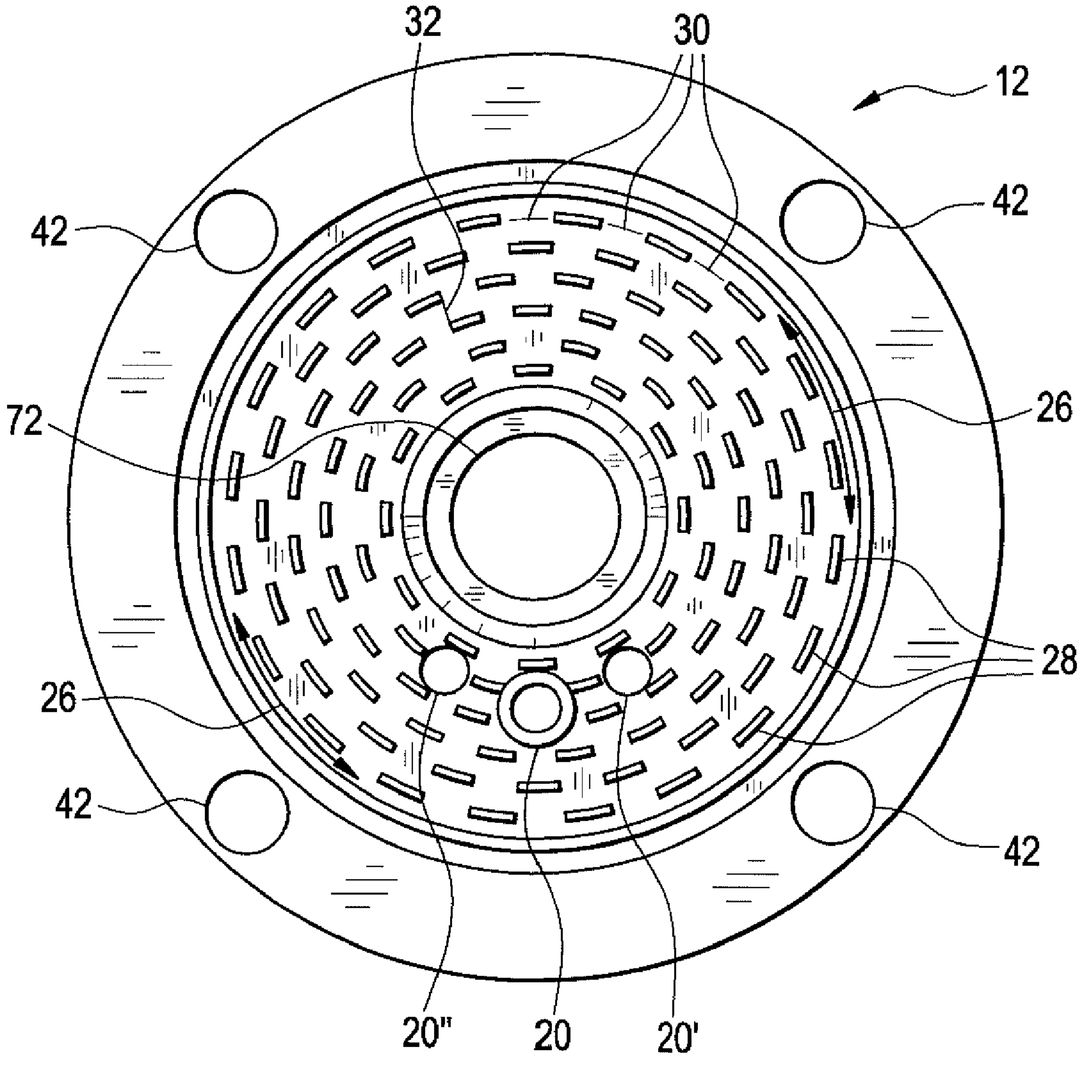
FIG. 3 is a plain view of a first stator.
Figure 5A:
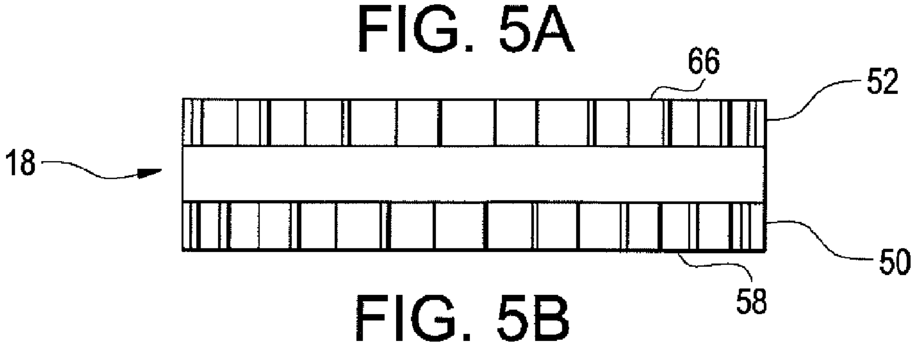
FIG. 5A is an elevated side view of a rotor.
Figure 5B:
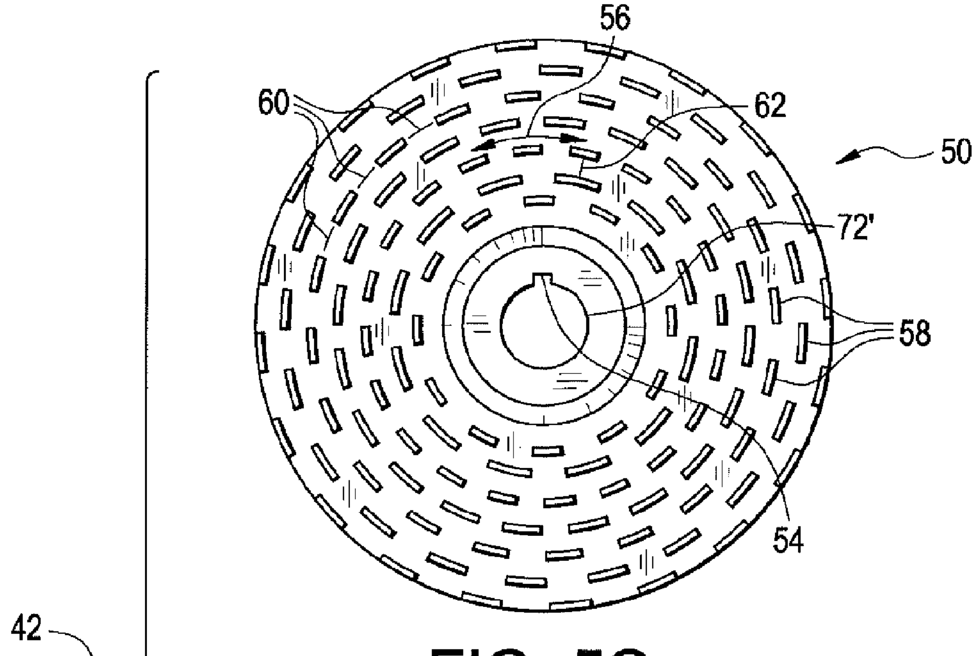
FIG. 5B is a plain view of a first surface of the rotor of FIG. 5A.
Figure 5C:
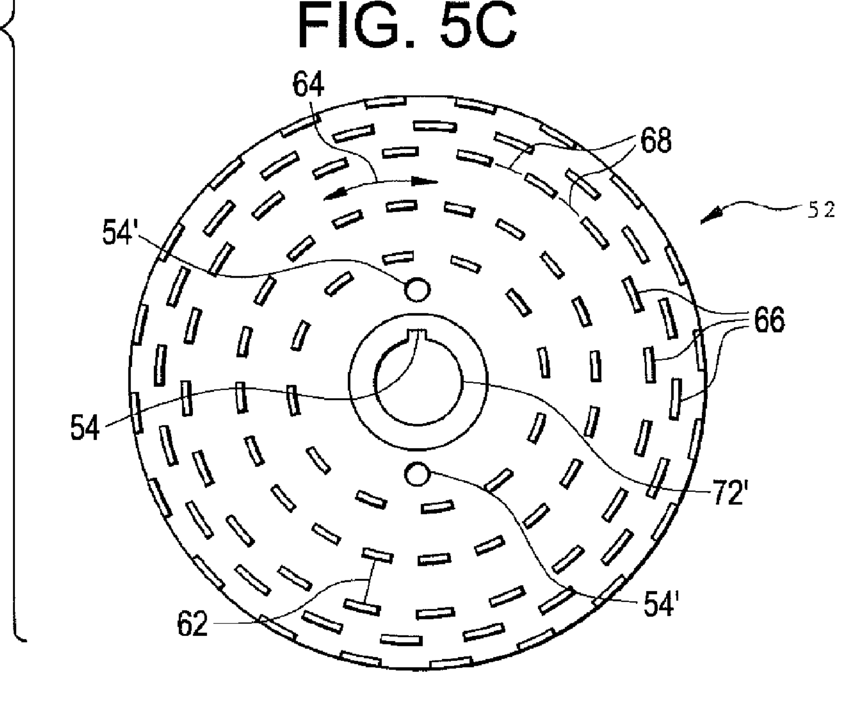
FIG. 5C is a plain view of a second surface of the rotor of FIG. 5A.

Referring to FIGS. 1, 2, and 3, first stator 12 may have any shape; for example, first stator 12 may have a circular shape. First stator 12 may further include a channel 72. First stator 12 may be provided with any number of generally ring-shaped stator teeth 26; for example, the first stator 12 may be provided with at least two generally ring-shaped stator teeth 26. Furthermore, the first stator 12 may be provided with at least one more generally ring-shaped stator teeth 26 than the second stator 14. Each generally ring-shaped stator teeth 26 is provided with multiple comb-shaped teeth 28 in a circumferential direction. Slits 30 are provide therebetween each of the multiple comb-shaped teeth 28. The generally ring-shaped stator teeth 26 may further be spaced apart any distance 32 from each other. Distance 32 therebetween generally ring-shaped stator teeth 26 may be a distance adapted to facilitate a higher shear force in the first chamber (not shown) than the second chamber (not shown); for example, distance 32 therebetween generally ring-shaped stator teeth 26 may be less than the distance 40 therebetween generally ring-shaped stator teeth 34 of the second stator 14 as shown in FIG. 5B, described in further details hereinbelow. First stator 12 may further include at least one first inlet port 20. First stator 12 may, for example, include one or more additional first inlet ports 20' and/or 20". In the alternative, referring to FIG. 6, device 10 for producing dispersions may be provided with first inlet port 21 wherein first inlet port 21 being in fluid communication with first chamber (not shown) via the channel 72. In the alternative, device 10 for producing dispersions may be provided with a combination of inlet ports 20, 20', 20", and/or 21 (not shown). First stator 12 may further include means 42 for coupling to second stator 14. Means 42 for coupling include, but are not limited to, interlocking mechanisms, nuts and bolts, and screws.

Figure 4A:
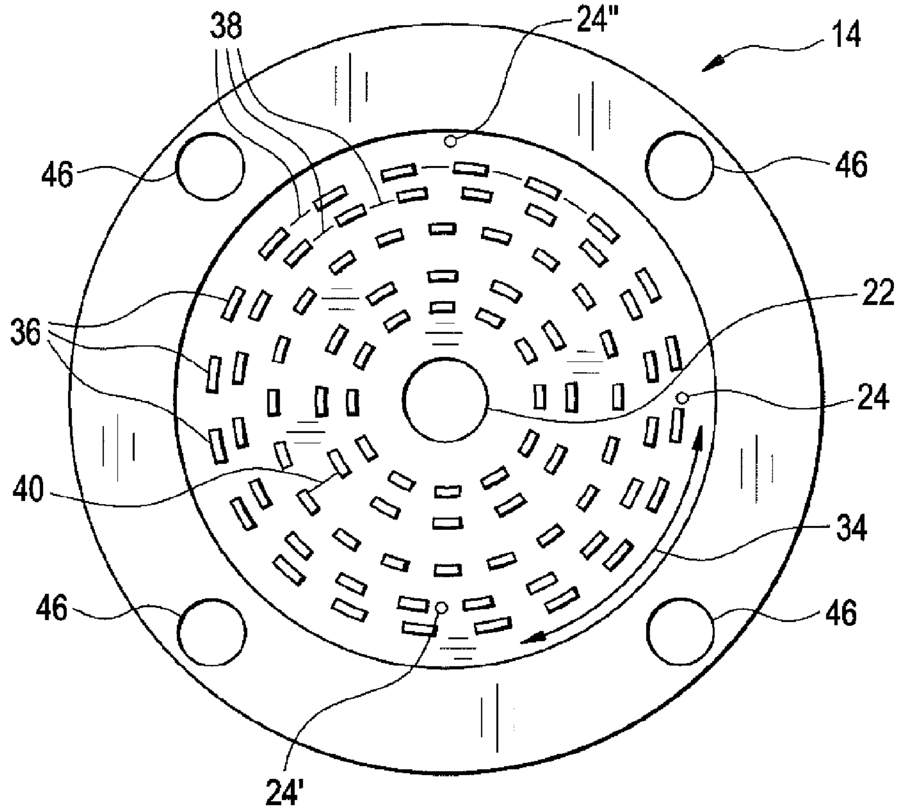
FIG. 4A is plain view of a second stator.

Referring to FIGS. 1, 2, and 4A, second stator 14 may have any shape; for example, second stator 14 may have a circular shape. Second stator 14 may be provided with any number of generally ring-shaped stator teeth 34; for example, the second stator 14 may be provided with at least two generally ring-shaped stator teeth 34. Furthermore, the second stator 14 may be provided with at least one less generally ring-shaped stator teeth 34 than the first stator 12. Each generally ring-shaped stator teeth 34 is provided with multiple comb-shaped teeth 36 in a circumferential direction. Slits 38 are provide therebetween each of the multiple comb-shaped teeth 36. The generally ring-shaped stator teeth 34 may be spaced apart any distance 40 from each other. Distance 40 therebetween generally ring-shaped stator teeth 34 may be a distance adapted to facilitate a lower shear rate in the second chamber (not shown) than the first chamber (not shown); for example, distance 40 therebetween generally ring-shaped stator teeth 34 may be greater than the distance 32 therebetween generally ring-shaped stator teeth 26 of the first stator 12 as shown in FIG. 2, described in further details hereinabove. Second stator 14 may further include at least one outlet port 22. Second stator 14 may optionally include at least one second inlet port 24. Second stator 14 may, for example, include additional second inlet ports 24' and/or 24". Second stator 14 may further include means 46 for coupling to first stator 12. Means 46 for coupling include, but are not limited to, interlocking mechanisms, nuts and bolts, and screws.

Figure 4B:
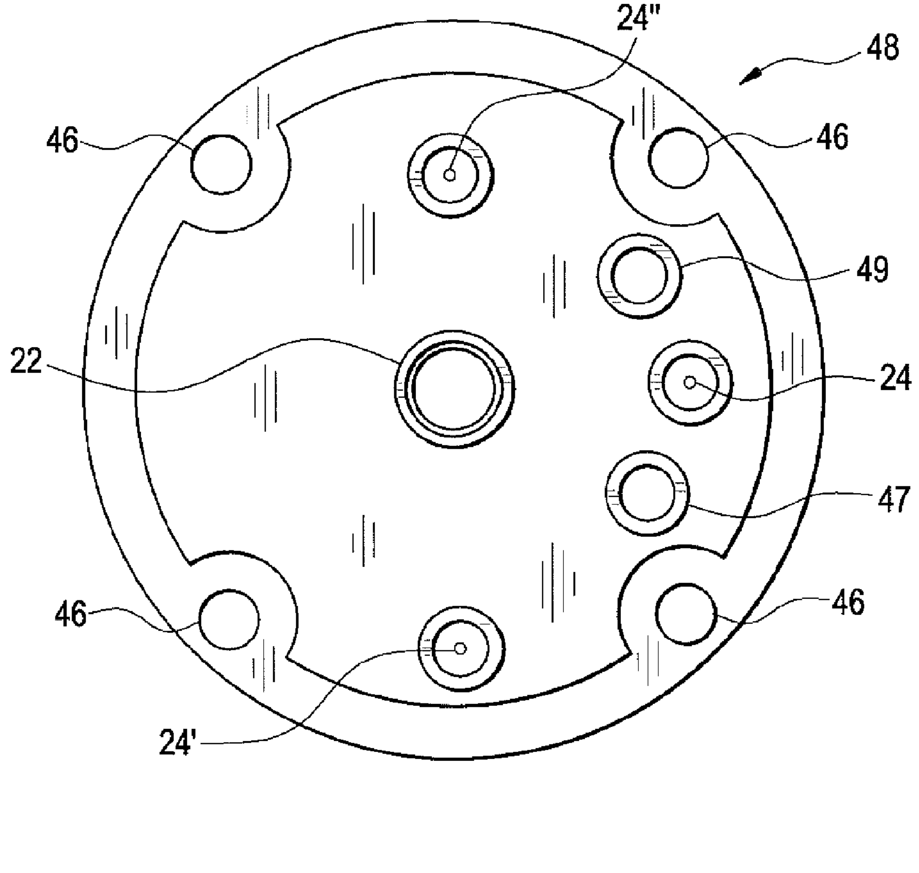
FIG. 4B is plain view of a distal endcap.

Referring to FIGS. 1, 2, and 4B, device 10 for producing dispersions may further include a distal endcap 48. Distal endcap 48 may include at least one outlet port 22. Distal endcap 48 may optionally include at least one second inlet port 24. Distal endcap 48 may, for example, include additional second inlet ports 24, 24' and/or 24". Distal endcap 48 may further include means 46 for coupling the second stator 14 to first stator 12. Means 46 for coupling include, but are not limited to, interlocking mechanisms, nuts and bolts, and screws.

Referring to FIGS. 1, 2, and 5A-C, rotor 18 may have any shape; for example, rotor 18 may have a disk shape. Rotor 18 may, for example, be provided with channel 72'. Rotor 18 includes a first surface 50, and second surface 52. First surface 50 is complementary to first stator 12, and second surface 52 is complimentary to second stator 14. First surface 50 is juxtaposed to the first stator 12 thereby forming the first chamber (not shown). The second surface 52 is juxtaposed to the second stator 14 thereby forming the second chamber. Rotor 18 may further include means 54 for coupling to a rotational shaft (not shown) coupled to a power source, for example, an electric motor (not shown). Means 54 for coupling to a rotational shaft (not shown) include, but are not limited to, interlocking mechanisms, nuts and bolts, and screws. First surface 50 may be provided with any number of generally ring-shaped rotor teeth 56; for example, the first surface 50 may be provided with at least two generally ring-shaped rotor teeth 56. Furthermore, the first surface 50 may be provided with at least one more generally ring-shaped rotor teeth 56 than the second surface 52. Each generally ring-shaped rotor teeth 56 is provided with multiple comb-shaped teeth 58 in a circumferential direction. Slits 60 are provided therebetween each of the multiple comb-shaped teeth 58. The generally ring-shaped rotor teeth 56 may be spaced apart any distance 62 from each other. Distance 62 therebetween generally ring-shaped rotor teeth 56 may be a distance adapted to facilitate a higher shear force in the first chamber (not shown) than the second chamber (not shown); for example, distance 62 therebetween generally ring-shaped rotor teeth 56 may be less than the distance 70 therebetween generally ring-shaped rotor teeth 64 of the second surface 52, described in further details hereinbelow. Second surface 52 may be provided with any number of generally ring-shaped rotor teeth 64; for example, the second surface 52 may be provided with at least two generally ring-shaped rotor teeth 64. Furthermore, the second surface 52 may be provided with at least one less generally ring-shaped rotor teeth 64 than the first surface 50. Each generally ring-shaped rotor teeth 64 is provided with multiple comb-shaped teeth 66 in a circumferential direction. Slits 68 are provided therebetween each of the multiple comb-shaped teeth 66. The generally ring-shaped rotor teeth 64 may be spaced apart any distance 70 from each other. Distance 70 therebetween generally ring-shaped rotor teeth 64 may be a distance adapted to facilitate a lower shear force in the second chamber (not shown) than the first chamber (not shown); for example, distance 70 therebetween generally ring-shaped rotor teeth 64 may be greater than the distance 62 therebetween generally ring-shaped rotor teeth 56 of the first surface 50, described in further details hereinabove.

Figure 6:
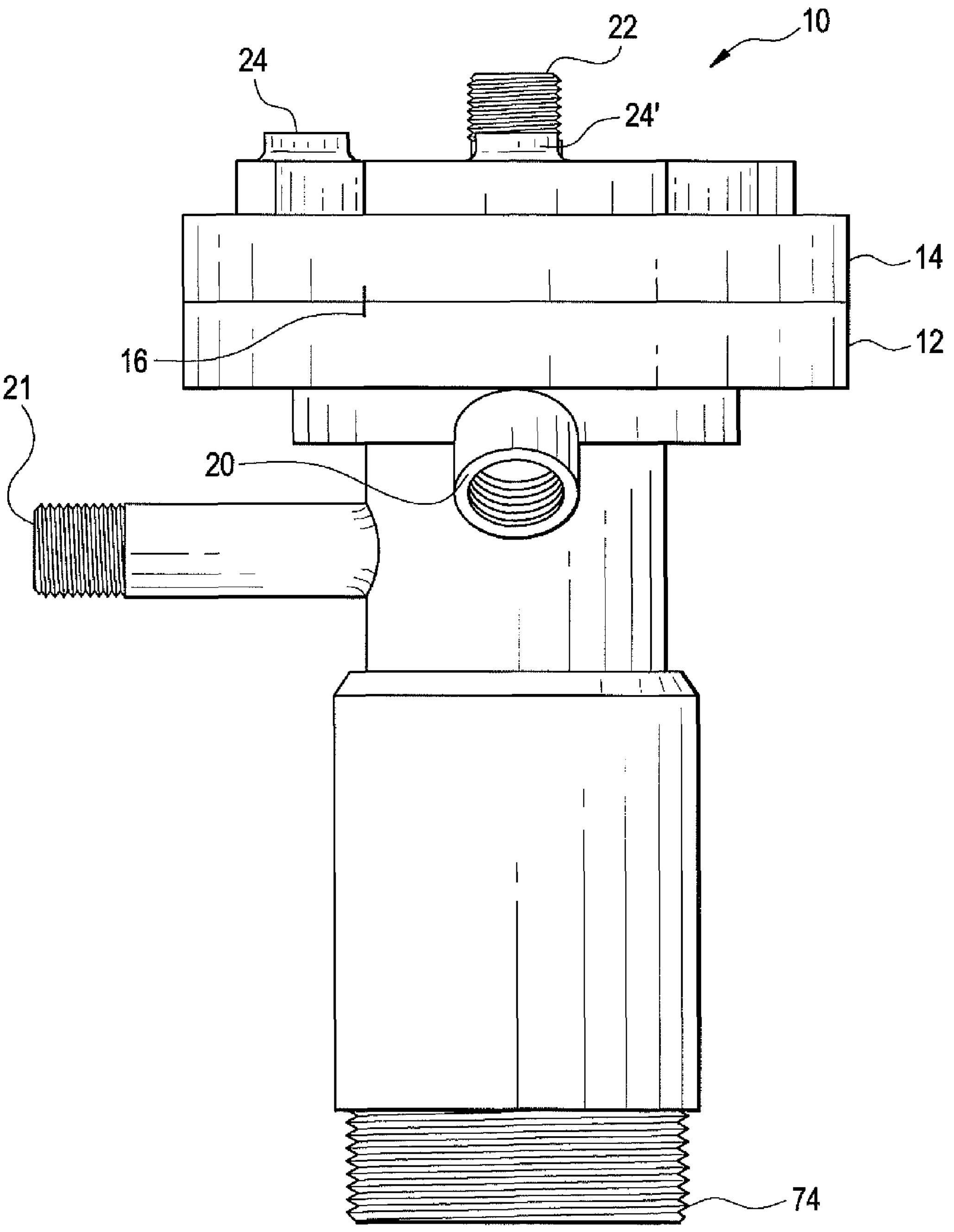
FIG. 6 is a second embodiment of a device for producing dispersions according to instant invention.

Referring to FIGS. 1 and 6, device 10 for producing dispersions may further include means 74 for coupling to a power source. Means 74 for coupling to a power source include, but are not limited to, interlocking mechanisms, nuts and bolts, and screws.

Referring to FIG. 4B, device 10 may further include a conventional cooling system. A conventional system may include a cooling inlet port 47 in fluid communication with an outlet port 49 thereby forming a cooling zone (not shown) on the outer layer of distal endcap 48 or shell 16. Cooling inlet port 47 may be supplied with a cooling liquid wherein the cooling liquid travels through the cooling zone, and then exits via cooling outlet port 49 thereby cooling device 10.

The instant invention is further described in connection with a process to produce, for example, a polyurethane dispersion; however, the instant invention is so not limited, and other polymeric dispersions may be produced via the device 10 for producing dispersions.

In operation, a prepolymer phase, described in further details hereinbelow, is introduced into the first chamber via first inlet port 20 while an aqueous phase, described in further details hereinbelow, and a surfactant, described in further details hereinbelow, are introduced simultaneously into the first chamber (not shown) via first inlet port 20' and/or inlet port 20". The prepolymer is emulsified into the aqueous phase via high shear force thereby forming a prepolymer emulsion. The prepolymer emulsion then travels into the second chamber (not shown), and a chain extender agent, described in further details hereinbelow, is introduced into the second chamber via the second inlet port 24. The prepolymer is chain extended via low shear force thereby forming a polyurethane dispersion. The polyurethane dispersion leaves the second chamber (not shown) via outlet port 22.

In an alternative operation, a polymeric phase, described in further details hereinbelow, is introduced into the first chamber via first inlet port 20 while an aqueous phase, described in further details hereinbelow, and a surfactant, described in further details herein below, are simultaneously introduced into the first chamber (not shown) via first inlet port 20' and/or inlet port 20". The polymeric phase is emulsified into the aqueous phase via high shear force thereby forming a polymeric emulsion. The polymeric emulsion then travels into the second chamber (not shown), and a diluent phase, described in further details hereinbelow, may optionally be introduced into the second chamber via the second inlet port 24 to, for example, dilute the polymeric dispersion via low shear force thereby forming a polymeric dispersion. The polymeric dispersion leaves the second chamber (not shown) via outlet port 22.

The term prepolymer phase, as used herein, refers to a stream containing a polyurethane prepolymer. The polyurethane prepolymer contains substantially no organic solvent and also has at least two isocyanate groups per one molecule. Such a polyurethane prepolymer, as used herein, further refers to a polyurethane prepolymer wherein the content of the organic solvent in the polyurethane prepolymer is 10 percent by weight or less based on the total weight of the prepolymer phase. To eliminate the step of removing the organic solvent, the content of the organic solvent may, for example, be 5 percent by weight or less based on the total weight of the prepolymer phase; or in the alternative, the content of the organic solvent may be 1 percent by weight or less based on the total weight of the prepolymer phase; or in another alternative, the content of the organic solvent may be 1 percent by weight or less based on the total weight of the prepolymer phase.

The number average molecular weight of the polyurethane prepolymer used in the present invention may, for example, be within the range from 1,000 to 200,000. All individual values and subranges from 1,000 to 200,000 are included herein and disclosed herein; for example, the polyurethane prepolymer may have a number average molecular weight in the range of 2,000 to about 20,000.

The polyurethane prepolymer used in the present invention may be produced by any conventionally known processes, for example, solution process, hot melt process, or prepolymer mixing process. Furthermore, the polyurethane prepolymer may, for example, be produced via a process for reacting a polyisocyanate compound with an active hydrogen-containing compound and examples thereof include 1) a process for reacting a polyisocyanate compound with a polyol compound without using an organic solvent, and 2) a process for reacting a polyisocyanate compound with a polyol compound in an organic solvent, followed by removal of the solvent.

For example, the polyisocyanate compound may be reacted with the active hydrogen-containing compound at a temperature in the range of 20° C. to 120° C.; or in the alternative, in the range of 30° C. to 100° C., at an equivalent ratio of an isocyanate group to an active hydrogen group of, for example, from 1.1:1 to 3:1; or in the alternative, from 1.2:1 to 2:1. In the alternative, the prepolymer may be prepared with an excess amount of polyols thereby facilitating the production of hydroxyl terminal polymers.

For example, an excess isocyanate group is optionally reacted with aminosilane, thereby converting the terminal group into a reactive group other than isocyanate group, such as an alkoxysilyl group.

The polyurethane prepolymer may further include a polymerizable acrylic, styrenic, or vinyl monomers as a diluent, which can then be polymerized by free radical polymerization via an initiator.

Examples of the polyisocyanate compound include 2,4-tolylene diisocyanate, 2,6-tolylene diisocyanate, m-phenylene diisocyanate, p-phenylene diisocyanate, 4,4'-diphenylmethane diisocyanate, 2,4'-diphenylmethane diisocyanate, 2,2'-diphenylmethane diisocyanate, 3,3'-dimethyl-4,4'-biphenylene diisocyanate, 3,3'-dimethoxy-4,4'-biphenylene diisocyanate, 3,3'-dichloro-4,4'-biphenylene diisocyanate, 1,5-naphthalene diisocyanate, 1,5-tetrahydronaphthalene diisocyanate, tetramethylene diisocyanate, 1,6-hexamethylene diisocyanate, dodecamethylene diisocyanate, trimethylhexamethylene diisocyanate, 1,3-cyclohexylene diisocyanate, 1,4-cyclohexylene diisocyanate, xylylene diisocyanate, tetramethylxylylene diisocyanate, hydrogenated xylylene diisocyanate, lysine diisocyanate, isophorone diisocyanate, 4,4'-dicyclohexylmethane diisocyanate, 3,3'-dimethyl-4,4'-dicyclohexylmethane diisocyanate, isomers thereof, and/or combinations thereof.

The active hydrogen-containing compound used to produce the polyurethane prepolymer used in the present invention includes, but is not limited to, for example, a compound having comparatively high molecular weight (hereinafter referred to as a high-molecular weight compound) and a compound having comparatively low molecular weight (hereinafter referred to as a low-molecular weight compound).

The number average molecular weight of the high-molecular weight compound may, for example, be within a range from 300 to 20,000; or in the alternative, within a range from 500 to 5,000. The number average molecular weight of the low-molecular weight compound may, for example, be less than 300. These active hydrogen-containing compounds may be used alone, or two or more kinds of them may be used in combination.

Among these active hydrogen-containing compounds, examples of the high-molecular weight compound include, but are not limited to aliphatic and aromatic polyester polyols including caprolactone based polyester polyols, seed oil based polyester polyols, any polyester/polyether hybrid polyols, PTMEG-based polyether polyols; polyether polyols based on ethylene oxide, propylene oxide, butylene oxide and mixtures thereof; polycarbonate polyols; polyacetal polyols, polyacrylate polyols; polyesteramide polyols; polythioether polyols; polyolefin polyols such as saturated or unsaturated polybutadiene polyol. polyol, polythioether polyol, polyolefin polyols such as polybutadiene polyol, and so on.

As the polyester polyol, polyester polyol, for example, obtained by the polycondensation reaction of a glycol described hereinafter and an acid may be used.

Examples of the glycol, which can be used to obtain the polyester polyol, include, but are not limited to, ethylene glycol, propylene glycol, 1,3-propanediol, 1,4-butanediol, 1,5-pentanediol, 3-methyl-1,5-pentanediol, 1,6-hexanediol, neopentyl glycol, diethylene glycol, triethylene glycol, tetraethylene glycol, polyethylene glycol, dipropylene glycol, tripropylene glycol, bishydroxyethoxybenzene, 1,4-cyclohexanediol, 1,4-cyclohexanedimethanol, bisphenol A, mixture of 1,3- and 1,4-cyclohexanedimethanol (UNOXOL™-diol), hydrogenated bisphenol A, hydroquinone, and alkylene oxide adducts thereof.

Examples of the acid, which can be used to obtain the polyester polyol, include, but are not limited to, succinic acid, adipic acid, azelaic acid, sebacic acid, dodecanedicarboxylic acid, maleic anhydride, fumaric acid, 1,3-cyclopentanedicarboxylic acid, 1,4-cyclohexanedicarboxylic acid, terephthalic acid, isophthalic acid, phthalic acid, 1,4-naphthalenedicarboxylic acid, 2,5-naphthalenedicarboxylic acid, 2,6-naphthalenedicarboxylic acid, naphthalic acid, biphenyldicarboxylic acid, 1,2-bis(phenoxy)ethane-p,p'-dicarboxylic acid, and anhydrides or ester-forming derivatives of these dicarboxylic acids; and p-hydroxybenzoic acid, p-(2-hydroxyethoxy)benzoic acid, and ester-forming derivatives of these hydroxycarboxylic acids.

Also a polyester obtained by the ring-opening polymerization reaction of a cyclic ester compound such as C-caprolactone, and copolyesters thereof may be used.

Examples of the polyether polyol include, but are not limited to, compounds obtained by the polyaddition reaction of one or more kinds of compounds having at least two active hydrogen atoms such as ethylene glycol, diethylene glycol, triethylene glycol, propylene glycol, trimethylene glycol, 1,3-butanediol, 1,4-butanediol, 1,6-hexanediol, neopentyl glycol, glycerin, trimethylolethane, trimethylolpropane, sorbitol, sucrose, aconite saccharide, trimellitic acid, hemimellitic acid, phosphoric acid, ethylenediamine, diethylenetriamine, triisopropanolamine, pyrogallol, dihydroxybenzoic acid, hydroxyphthalic acid, and 1,2,3-propanetrithiol with one or more kinds among ethylene oxide, propylene oxide, butylene oxide, styrene oxide, epichlorohydrin, tetrahydrofuran, and cyclohexylene.

Examples of the polycarbonate polyol include, but are not limited to, compounds obtained by the reaction of glycols such as 1,4-butanediol, 1,6-hexanediol, and diethylene glycol, with diphenyl carbonate and phosgene.

Among the active hydrogen-containing compounds, the low-molecular weight compound is a compound which has at least two active hydrogens per one molecule and has a number average molecular weight of less than 300, and examples thereof include, but are not limited to, glycol components used as raw materials of the polyester polyol; polyhydroxy compounds such as glycerin, trimethylolethane, trimethylolpropane, sorbitol, and pentaerythritol; and amine compounds such as ethylenediamine, 1,6-hexamethylenediamine, piperazine, 2,5-dimethylpiperazine, isophoronediamine, 4,4'-dicyclohexylmethanediamine, 3,3'-dimethyl-4,4'-dicyclohexylmethanedi-amine, 1,4-cyclohexanediamine, 1,2-propanediamine, hydazine, diethylenetriamine, and triethylenetetramine.

The urethane prepolymer may further include a hydrophilic group. The term "hydrophilic group," as used herein, refers to an anionic group (for example, carboxyl group, sulfonic acid group, or phosphoric acid group), or a cationic group (for example, tertiary amino group, or quaternary amino group), or a nonionic hydrophilic group (for example, a group composed of a repeating unit of ethylene oxide, or a group composed of a repeating unit of ethylene oxide and a repeating unit of another alkylene oxide).

Among hydrophilic groups, a nonionic hydrophilic group having a repeating unit of ethylene oxide may, for example, be preferred because the finally obtained polyurethane emulsion has excellent compatibility with other kinds of emulsions. Introduction of a carboxyl group and/or a sulfonic acid group is effective to make the particle size finer.

The ionic group refers to a functional group capable of serving as a hydrophilic ionic group which contributes to self dispersibility in water by neutralization, providing colloidal stability during the processing against agglomeration; stability during shipping, storage and formulation with other additives. These hydrophilic groups could also introduce application specific properties such as adhesion.

When the ionic group is an anionic group, the neutralizer used for neutralization includes, for example, nonvolatile bases such as sodium hydroxide and potassium hydroxide; and volatile bases such as tertiary amines (for example trimethylamine, triethylamine, dimethylethanolamine, methyldiethanolamine, and triethanolamine) and ammonia can be used.

When the ionic group is a cationic group, usable neutralizer includes, for example, inorganic acids such as hydrochloric acid, sulfuric acid, and nitric acid; and organic acids such as formic acid and acetic acid.

Neutralization may be conducted before, during or after the polymerization of the compound having an ionic group. Alternatively, neutralization may be conducted during or after the polyurethane polymerization reaction.

To introduce a hydrophilic group in the polyurethane prepolymer, a compound, which has at least one active hydrogen atom per one molecule and also has the above hydrophilic group, may be used as an active hydrogen-containing compound. Examples of the compound, which has at least one active hydrogen atom per one molecule and also has the above hydrophilic group, include:

(1) sulfonic acid group-containing compounds such as 2-oxyethanesulfonic acid, phenolsulfonic acid, sulfobenzoic acid, sulfosuccinic acid, 5-sulfoisophthalic acid, sulfanilic acid, 1,3-phenylenediamine-4,6-disulfonic acid, and 2,4-diaminotoluene-5-sulfonic acid, and derivatives thereof, or polyester polyols obtained by copolymerizing them;

(2) carboxylic acid-containing compounds such as 2,2-dimethylolpropionic acid, 2,2-dimethylolbutyric acid, 2,2-dimethylolvaleric acid, dioxymaleic acid, 2,6-dioxybenzoic acid, and 3,4-diaminobenzoic acid, and derivatives thereof, or polyester polyols obtained by copolymerizing them; tertiary amino group-containing compounds such as methyldiethanolamine, butyldiethanolamine, and alkyldiisopropanolamine, and derivatives thereof, or polyester polyol or polyether polyol obtained by copolymerizing them;

(3) reaction products of the above tertiary amino group-containing compounds, or derivatives thereof, or polyester polyols or polyether polyols obtained by copolymerizing them, with quaternizing agents such as methyl chloride, methyl bromide, dimethylsulfuric acid, diethylsulfuric acid, benzyl chloride, benzyl bromide, ethylenechlorohydrin, ethylenebromohydrin, epichlorohydrin, and bromobutane;

(4) nonionic group-containing compounds such as polyoxyethylene glycol or polyoxyethylene-polyoxypropylene copolymer glycol, which has at least 30 percent by weight of a repeating unit of ethylene oxide and at least one active hydrogen in the polymer and also has a molecular weight of 300 to 20,000, polyoxyethylene-polyoxybutylene copolymer glycol, polyoxyethylene-polyoxyalkylene copolymer glycol, and monoalkyl ether thereof, or polyester-polyether polyols obtained by copolymerizing them; and (5) combinations thereof.

The term "surfactants," as used herein, refers to any compound that reduces surface tension when dissolved in water or water solutions, or that reduces interfacial tension between two liquids, or between a liquid and a solid. Surfactants useful for preparing a stable dispersion in the practice of the present invention may be cationic surfactants, anionic surfactants, zwitterionic, or a non-ionic surfactants. Examples of anionic surfactants include, but are not limited to, sulfonates, carboxylates, and phosphates. Examples of cationic surfactants include, but are not limited to, quaternary amines. Examples of non-ionic surfactants include, but are not limited to, block copolymers containing ethylene oxide and silicone surfactants, such as ethoxylated alcohol, ethoxylated fatty acid, sorbitan derivative, lanolin derivative, ethoxylated nonyl phenol or alkoxylated polysiloxane. Furthermore, the surfactants can be either external surfactants or internal surfactants. External surfactants are surfactants which do not become chemically reacted into the polymer during dispersion preparation. Examples of external surfactants useful herein include, but are not limited to, salts of dodecyl benzene sulfonic acid, and lauryl sulfonic acid salt. Internal surfactants are surfactants which do become chemically reacted into the polymer during dispersion preparation. Examples of an internal surfactant useful herein include, but are not limited to, 2,2-dimethylol propionic acid and its salts, quaternized ammonium salts, and hydrophilic species, such polyethylene oxide polyols.

Polyurethane prepolymers are typically chain extended with a chain extender. Any chain extender known to be useful to those of ordinary skill in the art of preparing polyurethanes can be used with the present invention. Such chain extenders typically have a molecular weight of 30 to 500 and have at least two active hydrogen containing groups. Polyamines are a preferred class of chain extenders. Other materials, particularly water, can function to extend chain length and so are chain extenders for purposes of the present invention. It is particularly preferred that the chain extender is water or a mixture of water and an amine such as, for example, aminated polypropylene glycols such as Jeffamine D-400 and others from Huntsman Chemical Company, amino ethyl piperazine, 2-methyl piperazine, 1,5-diamino-3-methyl-pentane, isophorone diamine, ethylene diamine, diethylene triamine, triethylene tetramine, triethylene pentamine, ethanol amine, lysine in any of its stereoisomeric forms and salts thereof, hexane diamine, hydrazine and piperazine. In the practice of the present invention, the chain extender may be used as a solution of chain extender in water.

Examples of the chain extender used in the present invention include water; diamines such as ethylenediamine, 1,2-propanediamine, 1,6-hexamethylenediamine, piperazine, 2-methylpiperazine, 2,5-dimethylpiperazine, isophoronediamine, 4,4'-dicyclohexylmethanediamine, 3,3'-dimethyl-4,4'-dicyclohexylmethanediamine, 1,2-cyclohexanediamine, 1,4-cyclohexanediamine, aminoethylethanolamine, aminopropylethanolamine, aminohexylethanolamine, aminoethylpropanolamine, aminopropylpropanolamine, and aminohexylpropanolamine; polyamines such as diethylenetriamine, dipropylenetriamine, and triethylenetetramine; hydrazines; acid hydrazides. These chain extenders can be used alone or in combination.

The term "aqueous phase" as used herein, refers to water; emulsions of polyvinyl acetate, polyethylene-vinyl acetate, polyacrylic, and polyacrylic-styrenic; latexes of polystyrene-butadiene, polyacrylonitrile-butadiene, and polyacrylic-butadiene; aqueous dispersions of polyethylene and polyolefin ionomers; and various aqueous dispersions of polyurethane, polyester, polyamide, and epoxy resin.

The term "polymeric phase" as used herein, refers to emulsions of polyvinyl acetate, polyethylene-vinyl acetate, polyacrylic, and polyacrylic-styrenic; latexes of polystyrene-butadiene, polyacrylonitrile-butadiene, and polyacrylic-butadiene; aqueous dispersions of polyethylene and polyolefin ionomers; and various aqueous dispersions of polyurethane, polyester, polyamide, and epoxy resin.

The term "diluent phase" as used herein, refers to water; emulsions of polyvinyl acetate, polyethylene-vinyl acetate, polyacrylic, and polyacrylic-styrenic; latexes of polystyrene-butadiene, polyacrylonitrile-butadiene, and polyacrylic-butadiene; aqueous dispersions of polyethylene and polyolefin ionomers; and various aqueous dispersions of polyurethane, polyester, polyamide, and epoxy resin.

The present invention may be embodied in other forms without departing from the spirit and the essential attributes thereof, and, accordingly, reference should be made to the appended claims, rather than to the foregoing specification, as indicating the scope of the invention.

We claim:

1. A method of producing a polyurethane dispersion comprising the steps of:

providing a device for producing a dispersion comprising:

a first stator;

a second stator;

a shell encasing said first stator and said second stator;

a rotor, wherein said rotator is disposed therebetween said first stator and said second stator thereby forming a first chamber and a second chamber, wherein said first chamber is a high shear chamber, and said second chamber is a low shear chamber;

at least one first inlet port into said first chamber;

at least one outlet port out of said second chamber; and at least one second inlet port into said second chamber;

introducing a prepolymer phase and an aqueous phase into said first chamber via said first inlet ports;

emulsifying said prepolymer phase in said aqueous phase;

thereby producing a prepolymer emulsion;

introducing a chain extender agent into said emulsion in said second chamber via said second inlet port;

chain extending said prepolymer; and thereby producing a polyurethane dispersion.

2. The method of producing a polyurethane dispersion according to claim 1, wherein said second stator has a less number of ring-shaped stator teeth than said first stator.

3. The method of producing a polyurethane dispersion according to claim 1, wherein said rotor has a first surface and a second surface, and said second surface has a less number of ring-shaped rotor teeth than the said first surface.

4. A method of producing a polymeric dispersion, emulsion or latex comprising the steps of:

providing a device for producing a dispersion comprising:

a first stator;

a second stator;

a shell encasing said first stator and said second stator;

a rotor, wherein said rotator is disposed therebetween said first stator and said second stator thereby forming a first chamber and a second chamber, wherein said first chamber is a high shear chamber, and said second chamber is a low shear chamber;

at least one first inlet port into said first chamber;

at least one outlet port out of said second chamber; and optionally at least one second inlet port into said second chamber;

introducing a polymeric phase and an aqueous phase into said first chamber via said first inlet ports;

emulsifying said polymer phase in said aqueous phase;

thereby producing a polymeric emulsion;

optionally introducing a diluent phase into said second chamber via said optional said second inlet port; and thereby producing said polymeric dispersion, emulsion or latex.

5. The method of producing a polymeric dispersion according to claim 4, wherein said second stator has a less number of ring-shaped stator teeth than said first stator.

6. The method of producing a polymeric dispersion according to claim 4, wherein said rotor has a first surface and a second surface, and said second surface has a less number of ring-shaped rotor teeth than the said first surface.

* * * * *